(12) United States Patent
Pilon

(10) Patent No.: US 9,841,574 B1
(45) Date of Patent: Dec. 12, 2017

(54) DEFORMABLE LATCH MECHANISM FOR TRAY

(71) Applicant: BELDEN CANADA INC., Saint-Laurent (CA)

(72) Inventor: Vincent Pilon, Lachine (CA)

(73) Assignee: BELDEN CANADA INC., Saint-Laurent (CA)

( * ) Notice: Subject to any disclaimer, the term of this patent is extended or adjusted under 35 U.S.C. 154(b) by 0 days.

(21) Appl. No.: 15/617,318

(22) Filed: Jun. 8, 2017

Related U.S. Application Data

(60) Provisional application No. 62/347,162, filed on Jun. 8, 2016.

(51) Int. Cl.
*G02B 6/00* (2006.01)
*G02B 6/44* (2006.01)
*G02B 6/38* (2006.01)

(52) U.S. Cl.
CPC ......... *G02B 6/4452* (2013.01); *G02B 6/3897* (2013.01); *G02B 6/4453* (2013.01)

(58) Field of Classification Search
CPC .. G02B 6/4452; G02B 6/3897; G02B 6/4471; G02B 6/4453; G02B 6/4454; G02B 6/00
See application file for complete search history.

(56) References Cited

U.S. PATENT DOCUMENTS

| 8,189,984 | B2 * | 5/2012 | Kowalczyk | .......... | G02B 6/4441 385/135 |
| 8,326,107 | B2 * | 12/2012 | Cooke | ................. | G02B 6/4455 385/135 |

* cited by examiner

*Primary Examiner* — Jennifer Doan
(74) *Attorney, Agent, or Firm* — Hugh Mansfield

(57) ABSTRACT

A latch mechanism for retaining a tray in a selected one of a first, second position and third position. The latch mechanism comprises notches arranged on an inner surface of the housing along an axis parallel to a direction of travel of the tray, an elongate actuator on the tray and opposite the inner surface, the actuator comprising a first elongate member and a second elongate member, an inner end of the first elongate member connected to an inner end of the second elongate member at a connection point, a stop positioned at the connection point wherein the stop is biased laterally towards the inner surface. By increasing a distance between an outer end of the first elongate member and an outer end of the second elongate member the stop is moveable from an unactuated state wherein the stop is engageable by a selected one of the notches and such that the tray is retainable in a selected one of the first, second and third position, to an actuated state wherein the stop moves laterally against the biasing force away from the inner surface and such that the stop is no longer engageable by one of the notches.

7 Claims, 7 Drawing Sheets

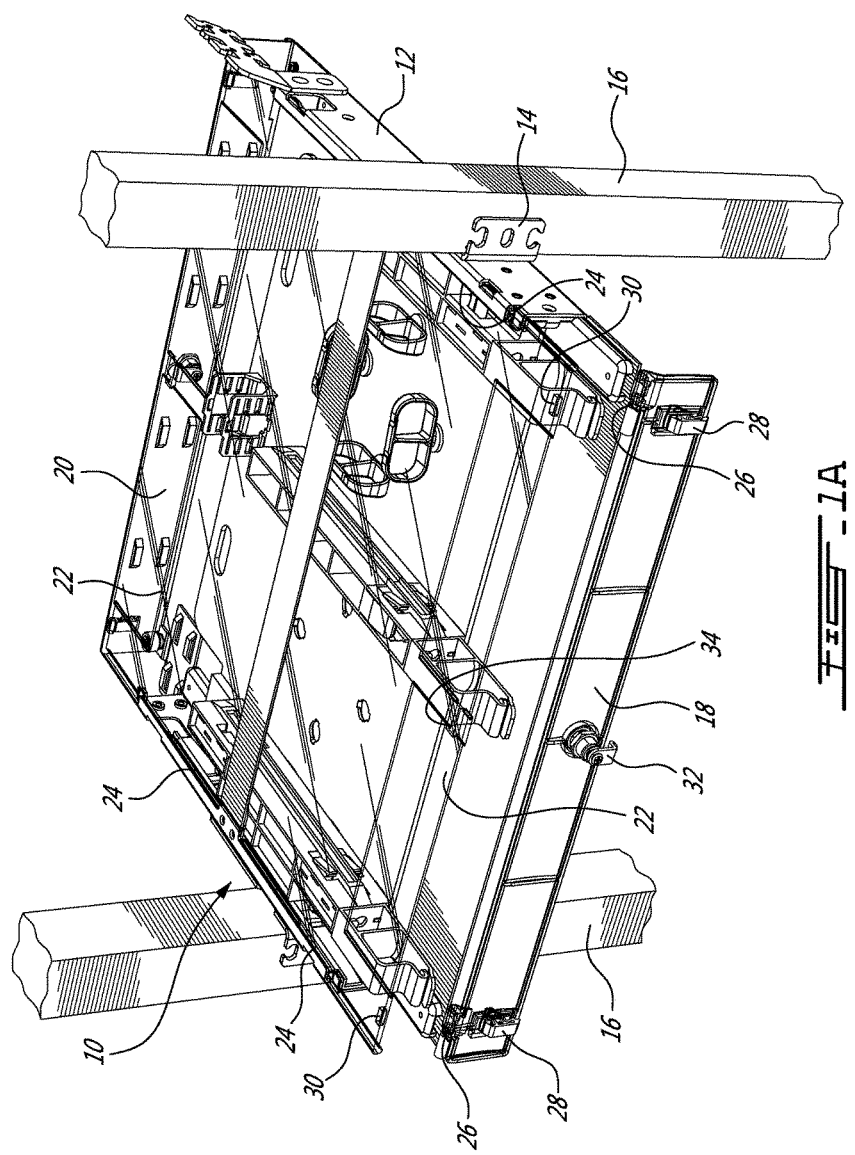

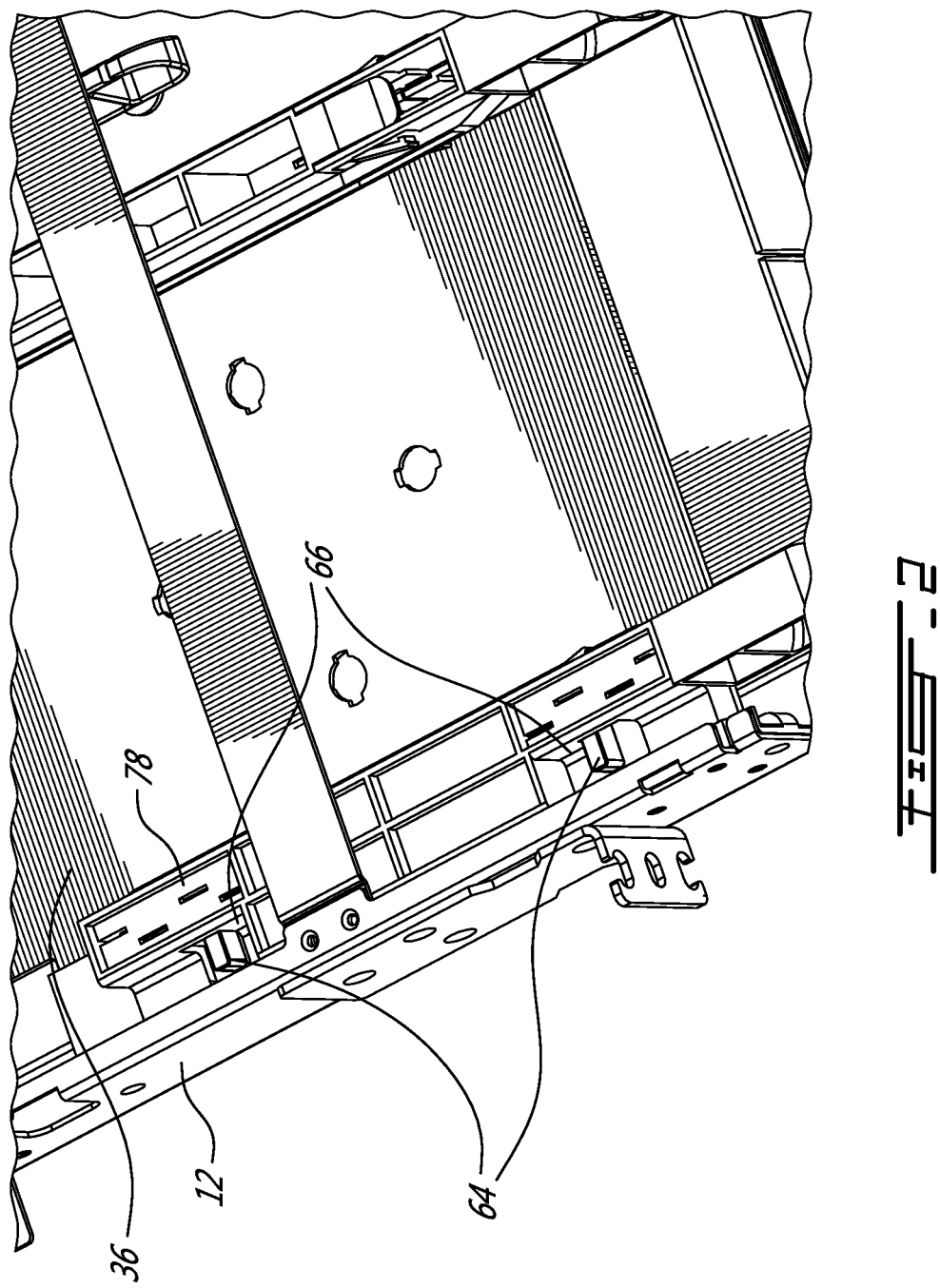

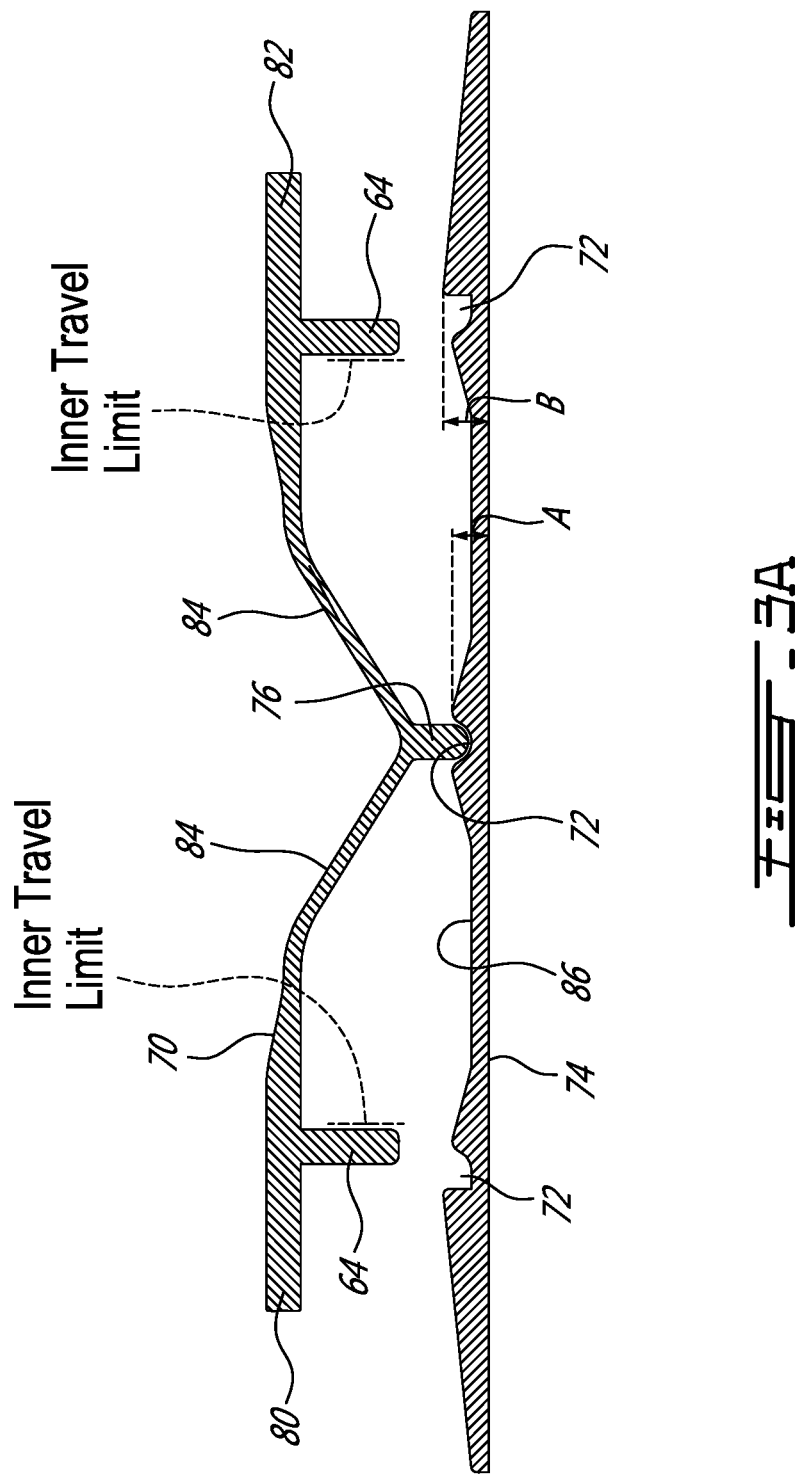

US 9,841,574 B1

DEFORMABLE LATCH MECHANISM FOR TRAY

This application claims benefit under 35 U.S.C. §119(e) of U.S. provisional application Ser. No. 62/347,162 filed on Jun. 8, 2016 which is incorporated herein in its entirety by reference.

FIELD OF THE INVENTION

The present invention relates to a deformable latch mechanism for tray.

BACKGROUND TO THE INVENTION

The prior art discloses sliding trays including a latch mechanism which can be engaged and disengaged to selectively allow the tray to be held or to slide. One drawback is that these mechanisms are only accessible from the front of the tray. As such, there is a need for a latch mechanism which can be actuated equally from both the front and the back of the tray.

SUMMARY OF THE INVENTION

In order to address the above and other drawbacks there is provided an optic fiber equipment comprising an equipment housing configured for mounting in a 19" rack, the housing defining a front opening and a rear opening opposite the front opening, a tray disposed within the housing and slideable between a first position where at least a portion of the tray extends in front of the front opening and a second position wherein the tray is positioned between the front opening and the rear opening, and a latch mechanism for retaining the tray in a selected one of the first position and the second position. The latch mechanism comprises two notches arranged on an inner surface of the housing along an axis parallel to a direction of travel of the tray, one of the notches corresponding to a respective one of the first position and the second position, an elongate actuator on the tray and opposite the inner surface, the actuator comprising a first elongate member and a second elongate member, an inner end of the first elongate member connected to an inner end of the second elongate member at a connection point, a stop positioned at the connection point wherein the stop is biased laterally towards the inner surface. By increasing a distance between an outer end of the first elongate member and an outer end of the second elongate member the stop is moveable from an unactuated state wherein the stop is engageable by a selected one of the notches and such that the tray is retainable in a selected one of the first and the second position, to an actuated state wherein the stop moves laterally against the biasing force away from the inner surface and such that the stop is no longer engageable by one of the notches.

BRIEF DESCRIPTION OF THE DRAWINGS

FIG. 1A provides a raised right perspective view of a fiber optic equipment with tray in a middle position and in accordance with an illustrative embodiment of the present invention;

FIG. 2 provides a raised detailed view of an actuator mechanism for a fiber optic equipment tray with tops removed and in accordance with an illustrative embodiment of the present invention; and FIGS. 3A through 3C provide top plan schematic views of an actuator mechanism in accordance with an illustrative embodiment of the present invention.

DETAILED DESCRIPTION OF THE ILLUSTRATIVE EMBODIMENTS

Figure 1B:
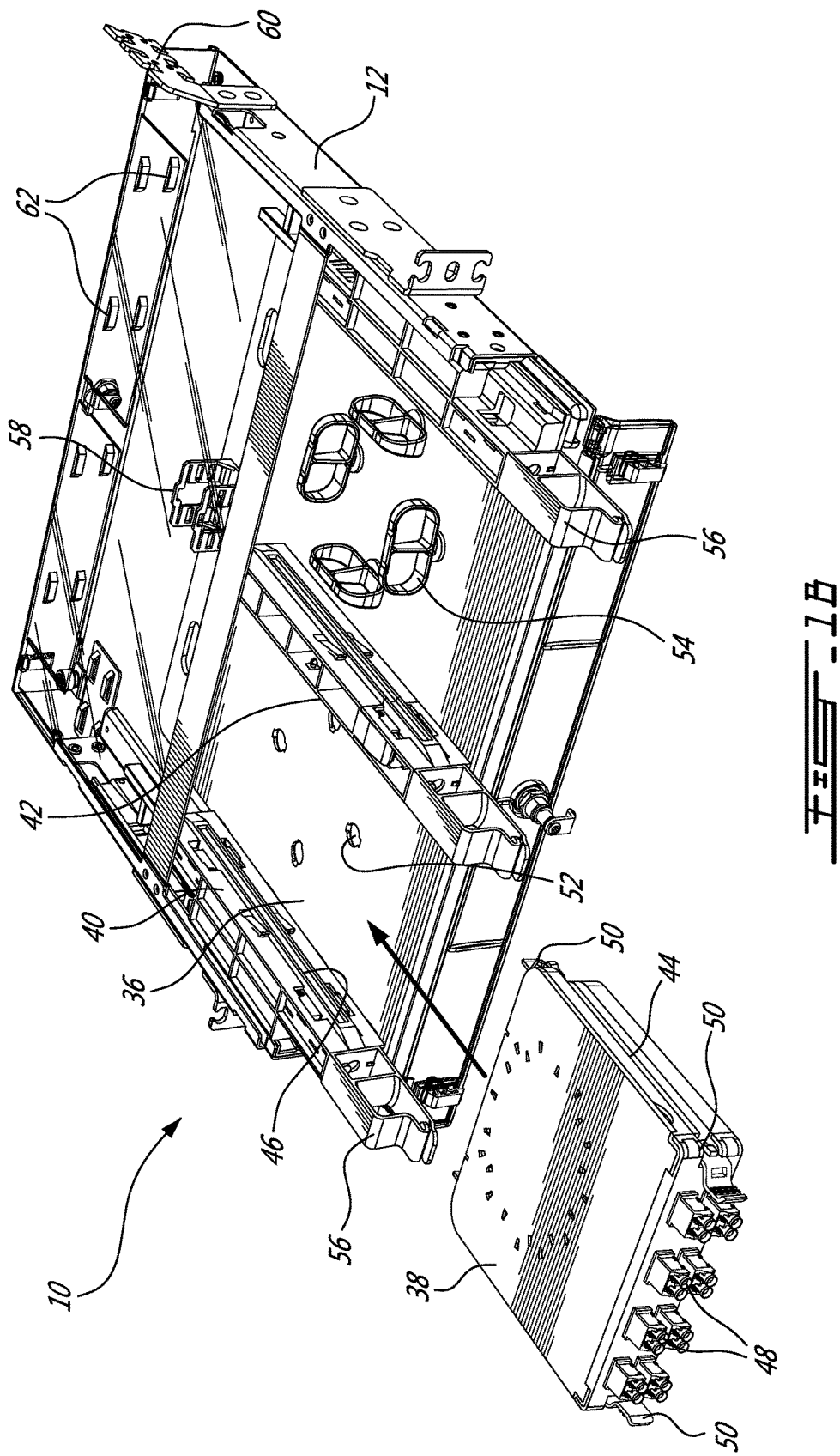
FIG. 1B provides a raised right perspective view of a fiber optic equipment with tops removed and tray in a forward extended position and in accordance with an illustrative embodiment of the present invention.

Referring now to FIG. 1A, a fiber optic equipment, generally referred to using the reference numeral 10, will now be described. The fiber optic equipment 10 comprises a housing 12 illustratively attachable by way of brackets 14 to a 19" (19 inch) rack 16. The housing 12 defines openings which may be closed by doors 18, 20. In particular embodiment the edges of the tops 22 are retained in opposed grooves 24 in the housing 12 and are removable by sliding the tops 22 out of the grooves 24. Additionally, the tops 22 may be manufactured from a transparent material such as polycarbonate or the like and such that a user may more readily view inside the housing 12. The doors 18, 20 are attached to the housing via hinges 26 and such that they may be moved between an open position and a closed position. Door catches 28 are provided on either end of the door which engage complementary cut outs 30 in the tops 22 to retain the doors 18, 20 in the closed position. Additionally, a key actuated lock 32 is provided to secure the door in the closed positioned by engaging a complementary slot 34 in the top 22.

Figure 1C:
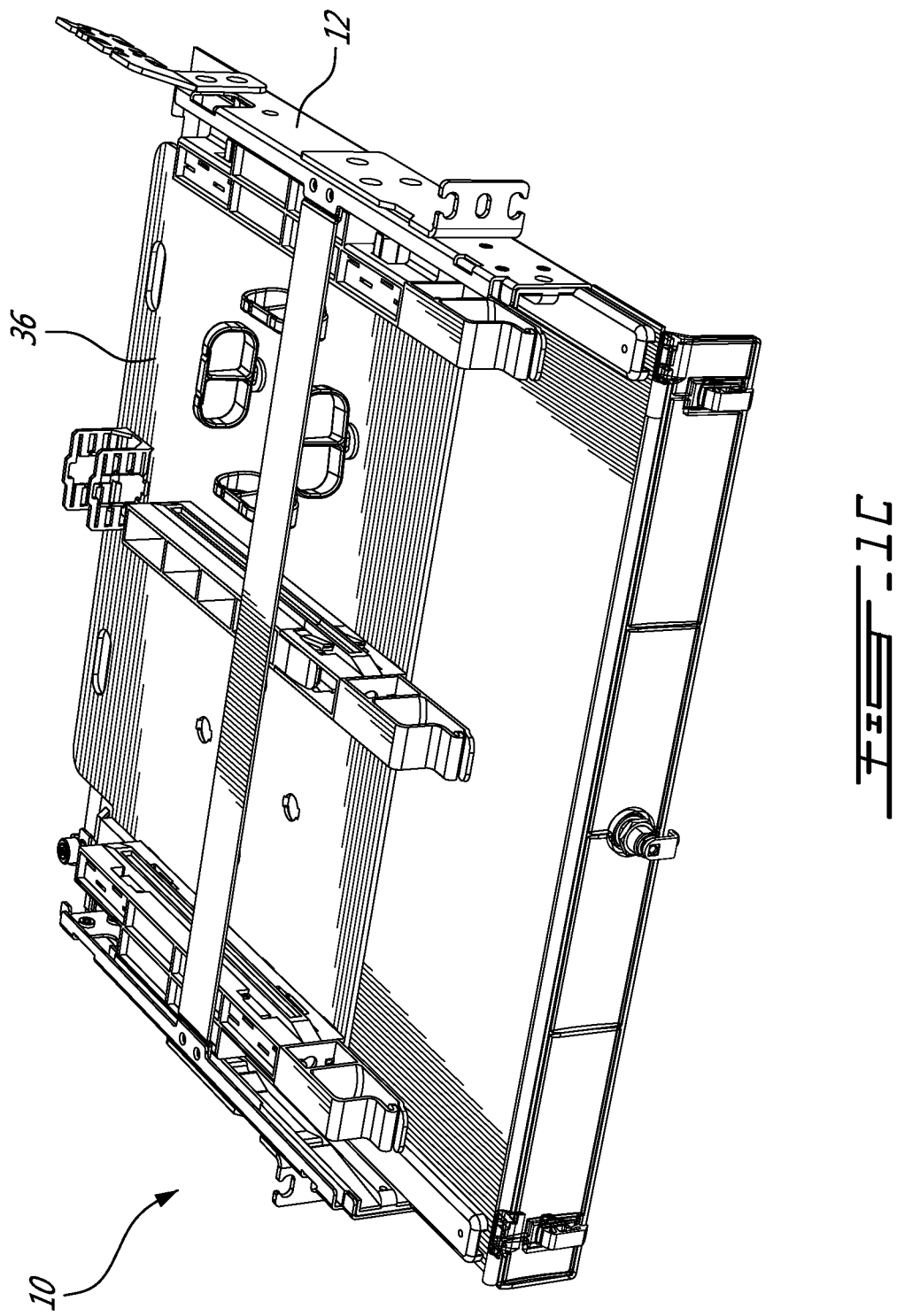
FIG. 1C provides a raised right perspective view of a fiber optic equipment with tops removed and tray in a rearward extended position and in accordance with an illustrative embodiment of the present invention.

Referring to FIGS. 1B and 1C in addition to FIG. 1A, a slideable tray 36 is provided within the housing 12 and is slideable between a middle position (as shown in FIG. 1A), a first forward position (as shown in FIG. 1B) and a second rearward position (as shown in FIG. 1C). In each of these positions, and as will be described below, the tray is secured via a latching mechanism.

Referring to FIG. 1B, the tray 36 is illustratively configured for slideably receiving at least one fiber optic cassette 38 between a pair of supports 40, 42. In this regard, slots 44 in the cassette 38 are engaged by complementary rails 46 as the cassette 38 is inserted between the supports 40, 42. Illustratively the cassette comprises a plurality of fiber optic connectors 48 arranged along a front face for terminating fiber optic cables (not shown). Thumb tabs 50 are provided which may be actuated for releasing the cassette 38 from the rails 46. In this regard the cassette 38 comprises thumb tabs 50 at both ends and such that the cassette can be inserted or removed in either direction. The tray 36 may also comprise cut outs 52 which can be used to secure fiber optic cable routing guides 54 or the like to the surface of the tray 36. Retainers 56 are also provided on the ends of the supports for managing patch cords or the like (not shown) and one or more brackets 58 may be provided for slack storage or strain relief and the like. Various additional brackets 60 may be provided to secure cables and the like and provide stain relief. Additionally, inner surfaces of the housing 12 may be shaped to include raised straps 62 for receiving twist ties (not shown) and the like and such that cables (also not shown) may be secured against the housing 12.

Referring now to FIG. 2, the tray 36 may be moved relative to the housing by disengaging a latch mechanism between the tray 36 and the housing 12. This can be done by first removing the tops 22 and then actuating a selected one of a pair of actuator tabs 64, for example by inserting a finger or the like into a gap 66 immediately behind the actuator and then pulling the actuator tab 64 towards a proximate opening. Alternatively, and as will be discussed in more detail below, a user can simply pull (or push) on the end of the tray with sufficient force to disengage the latch mechanism thus allowing the tray 36 to be moved to an adjacent position.

Referring to FIG. 3A in addition to FIG. 2, the actuator mechanism comprises an elongate actuator 70 comprising a first elongate member and a second elongate member and manufactured at least in part from a relative flexible material such as soft plastic or the like, and a plurality of notches 72 arranged along an axis in parallel to the actuator 70. Illustratively, the notches 72 can form part of a guide 74 manufactured from a rigid material such as hard plastic or the like. In particular embodiment, however the notches 72 could be moulded or otherwise formed in the housing 12. The actuator further comprises a stop 76 located towards the centre of the actuator 70 at a point interconnecting the inner ends of the first elongate member and the second elongate member, and between the pair of actuator tabs 64 towards either end of the actuator 70. The actuator 70 is retained within an actuator housing 78 secured to the tray and such that the outer ends 80, 82 of the actuator 70 are limited to travel in a direction parallel to the housing 12/guide 74. Additionally, the inner travel of the actuator tabs 64 is limited by the actuator housing and such that the actuator tabs 64 may only be moved away from each other. The connecting sections 84 of the actuator are elastic serve to bias the stop 76 towards the notches 72 and an exposed surface 86 of the housing 12/guide 74 and such that the stop 76 rests, for example, within a selected one of the notches 72, thereby preventing unintended movement of the tray 36. Each of the notches 72 has an inner depth A while the outer pair of notches have an outer depth B greater than that of A.

Figure 3B:
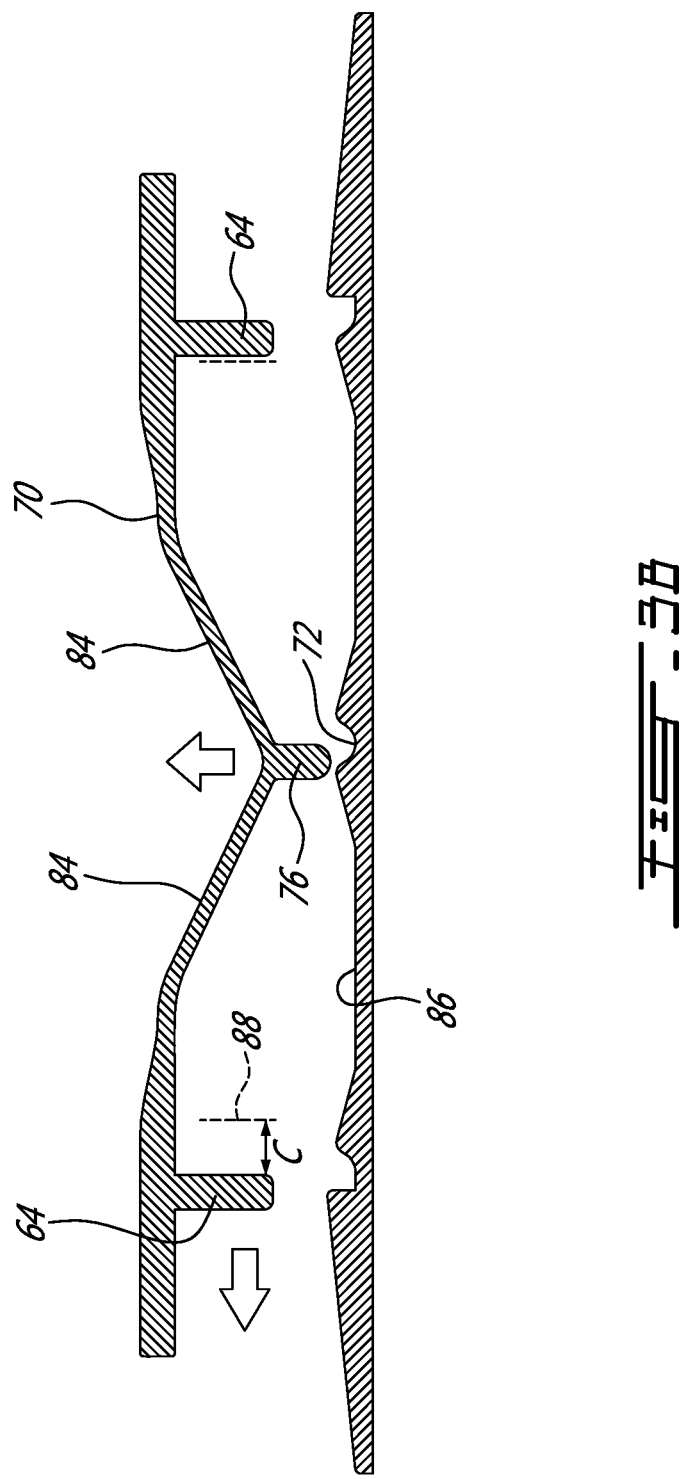

Referring now to FIG. 3B, by moving a selected one of the actuator tabs 64 away from the limit 88 and the other actuator tab 64 a first actuating distance C, the actuator 70 is lengthened causing the connecting sections 84 to flex away from the exposed surface 86 of the housing 12/guide 74 and such that the stop 76 is moved laterally a distance A and retracted from the notch 72, thereby releasing the tray 36 such that it can be slid into the next selected position. Alternatively, and as discussed briefly above, a user can simply pull (or push) on the end of the tray 36 which in turn causes the stop 76 to be engaged by the sloped edges of the notch 72. Provided the user pulls or pushes with enough force, movement of the tray 36 will cause the sloped edges of the notch 72 to engage the tip of the stop 76 and counter the biasing force generated by the connecting sections 84. As a result the stop 76 will be forced out of the notch 72 and able to travel to an adjacent position.

Figure 3C:
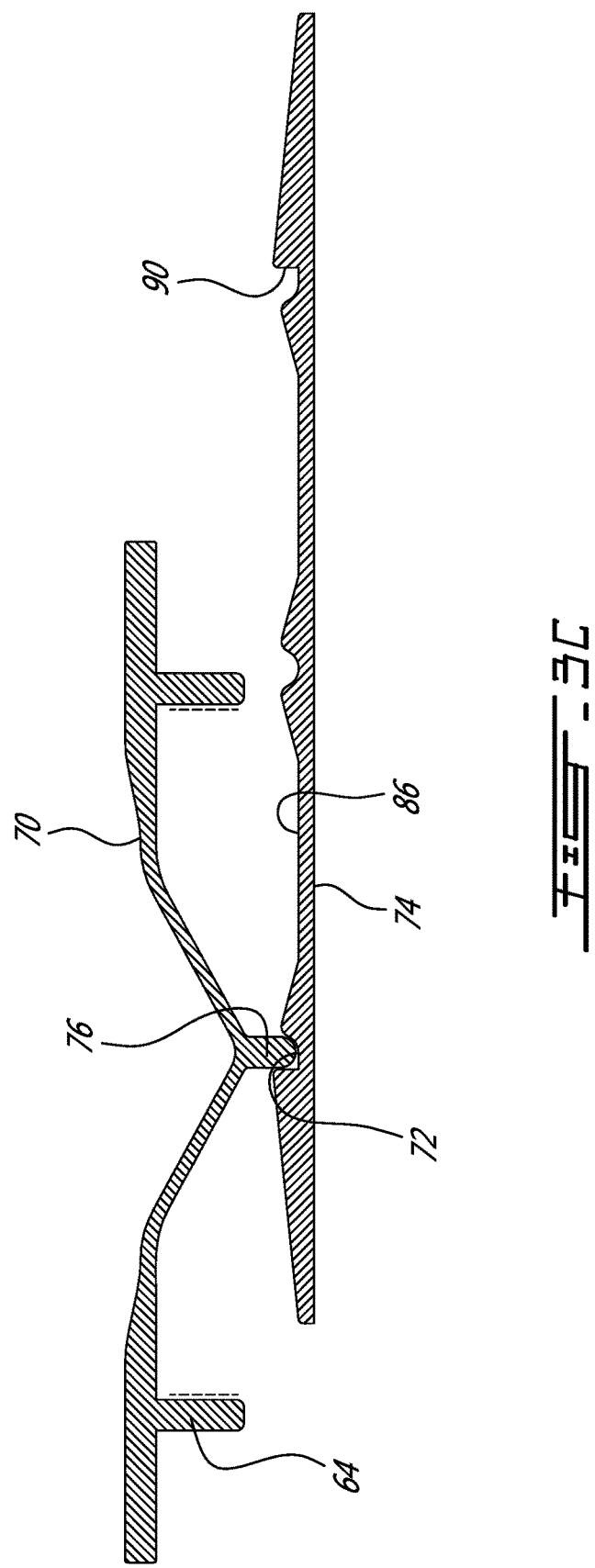

Referring to FIG. 3C, on release of the actuator tab 64 the connecting sections 84 again bias the stop 76 towards the exposed surface 86 of the housing 12/guide 74 and such that as the tray 36 is slid vis-à-vis the housing 12, the stop 76 will eventually come to rest in the next adjacent notch 72, thereby by securing the tray against the housing in a second selected position.

Referring back to FIG. 3A in addition to FIG. 3C, the tray 36 can be entirely removed from the housing 12 by moving a selected one of the actuator tabs 64 away from the limit 88 and the other actuator tab 64 a second actuating greater than the actuating distance C, the actuator 70 is can be further lengthened causing the connecting sections 84 to flex away from the exposed surface 86 of the housing 12/guide 74 and such that the stop 76 is moved laterally a distance B thereby releasing the tray 36 such that it can be removed from the housing 12. In this regard, the rear edge 90 of the outer pair of notches 72 display no slope, and as a result simply pulling (or pushing) against the edge of the tray 36 is typically insufficient to force the stop 76 over this edge. This prevents for example accidental removal of the tray 36 from the housing 12.

Referring back to FIG. 1A, a person of ordinary skill in the art will now understand that illustratively a pair of latch mechanisms are provided, one on either side of the tray 36, and such that, in order to release the tray 36 such that it can be moved between selected positions, two actuator tabs 64 on either side of the tray 36 must be simultaneously activated. Additionally, a person of ordinary skill in the art will also now understand that the latch mechanisms can be activated from either side of the tray 36, advantageously allowing, for example, the tray to be moved by a user positioned either in front of the tray or behind the tray 36.

Although the present invention has been described hereinabove by way of specific embodiments thereof, it can be modified, without departing from the spirit and nature of the subject invention as defined in the appended claims.

I claim:

1. An optic fiber equipment comprising:
   an equipment housing configured for mounting in a 19" rack, said housing defining a front opening and a rear opening opposite said front opening;
   a tray disposed within said housing and slideable between a first position where at least a portion of said tray extends in front of said front opening and a second position wherein said tray is positioned between said front opening and said rear opening; and
   a latch mechanism for retaining said tray in a selected one of said first position and said second position, said latch mechanism comprising:
      two notches arranged on an inner surface of said housing along an axis parallel to a direction of travel of said tray, one of said notches corresponding to a respective one of said first position and said second position;
      an elongate actuator on said tray and opposite said inner surface, said actuator comprising a first elongate member and a second elongate member, an inner end of said first elongate member connected to an inner end of said second elongate member at a connection point, a stop positioned at said connection point wherein said stop is biased laterally towards said inner surface;
      wherein by increasing a distance between an outer end of said first elongate member and an outer end of said second elongate member said stop is moveable from an unactuated state wherein said stop is engageable by a selected one of said notches and such that said tray is retainable in a selected one of said first and said second position, to an actuated state wherein said stop moves laterally against said biasing force away from said inner surface and such that said stop is no longer engageable by one of said notches.

2. The optic fiber equipment of claim 1, wherein said equipment housing comprises one of a 1U housing, a 2U housing, a 3U housing and a 4U housing.

3. The optic fiber equipment of claim 1, wherein said elongate members are joined at a bend and further wherein by increasing said distance said bend is straightened against a countering biasing force, said biasing force biasing said stop towards said inner surface.

4. The optic fiber equipment of claim 1, wherein said tray is slideable between said first position, said second position and a third position wherein said tray is positioned in front of said rear opening, wherein said latch mechanism comprises a third notch arranged on an inner surface of said housing along an axis parallel to a direction of travel of said tray and corresponding to said third position and wherein by increasing said distance between said outer end of said first elongate member and said outer end of said second elongate member said stop is moveable from said unactuated state wherein said stop is engageable by a selected one of said first, second and third notches and such that said tray is retainable in a selected one of said first, said second and said third position, to said actuated state.

5. The optic fiber equipment of claim 4, wherein said three notches are equidistant.

6. The optic fiber equipment of claim 1, wherein said distance is increased by one of limiting travel of said outer end of said second elongate member towards said outer end of said first elongate member and moving said outer end of said first elongate member away from said outer end of said second elongate member and/or limiting travel of said outer end of said first elongate member outer end of said second elongate member and moving said outer end of said second elongate member away from said outer end of said first elongate member.

7. The optic fiber equipment of claim 6, wherein each of said outer ends comprises an actuator tab and wherein travel of each of said outer ends is limited by said actuator tab coming into contact with an inner travel limiter.

* * * * *